US007293819B2

(12) United States Patent
Duffy

(10) Patent No.: US 7,293,819 B2
(45) Date of Patent: Nov. 13, 2007

(54) DECKLID HINGE WITH MOTOR TO AUTOMATE OPENING AND CLOSING

(75) Inventor: Michael J. Duffy, Midland (CA)

(73) Assignee: M&C Corporation, Sterling Heights, MI (US)

( * ) Notice: Subject to any disclaimer, the term of this patent is extended or adjusted under 35 U.S.C. 154(b) by 0 days.

(21) Appl. No.: 11/278,485

(22) Filed: Apr. 3, 2006

(65) Prior Publication Data

US 2007/0228763 A1 Oct. 4, 2007

(51) Int. Cl.
*B62D 25/10* (2006.01)

(52) U.S. Cl. ........................ 296/76; 296/146.4; 49/340

(58) Field of Classification Search .................. 296/76, 296/146.8, 146.4; 49/280, 340, 345, 349, 49/354, 359

See application file for complete search history.

(56) References Cited

U.S. PATENT DOCUMENTS 3,713,472 A * 1/1973 Dozois ....................... 160/189
4,452,015 A 6/1984 Jacques et al.
6,520,557 B2 * 2/2003 Benthaus et al. ............. 296/76
6,719,356 B2 4/2004 Cleland et al.
6,736,440 B1 * 5/2004 Hashim et al. ............... 296/76
6,789,357 B1 9/2004 McCullough
6,789,834 B2 * 9/2004 Schlegel ...................... 296/76
6,883,275 B2 4/2005 Hellinga et al.
7,083,217 B2 * 8/2006 Fukumoto et al. ............ 296/76
2001/0038219 A1 11/2001 Clare et al.
2002/0008400 A1 * 1/2002 Hess et al. .................... 296/76
2002/0084668 A1 * 7/2002 Yamagishi et al. ........... 296/76
2004/0178654 A1 * 9/2004 Hahn .......................... 296/76
2006/0066125 A1 * 3/2006 Kuan et al. .................... 296/76
2006/0071503 A1 * 4/2006 Miyake et al. ........... 296/146.4
2006/0232090 A1 * 10/2006 Duffy .......................... 296/76

* cited by examiner

*Primary Examiner*—Jason S Morrow
(74) *Attorney, Agent, or Firm*—Brooks Kushman P.C.

(57) ABSTRACT

A vehicle decklid displacement mechanism includes a linkage for leveraging displacement of the lid with respect to a vehicle body, an extension strut having spring means biasing the ends of the strut away from each other and a motorized crank. The crank is driven by the motor for pivotal engagement with the extendable strut so that the combined leverage of the linkage and the biasing of the strut geometrically urge the decklid to an open position. A position of the crank is adjusted by the motor to retract the decklid from its fully open position, at which point the weight of the lid overcomes the leverage of the linkage and the biasing of the extendable strut to displace the decklid toward its open position.

11 Claims, 4 Drawing Sheets

DECKLID HINGE WITH MOTOR TO AUTOMATE OPENING AND CLOSING

BACKGROUND OF THE INVENTION

1. Field of the Invention

The present invention relates to vehicle trunks and the decklids pivotally mounted to a motor vehicle body for closing the trunk's access opening by a mechanism, in which a linkage supports the decklid with respect to the vehicle body. Additional support in the form of extendable struts that linearly expand to assist decklid displacement and a motorized lever engaged with the strut that permits the combination of the linkage and the strut to induce opening or closing displacement of the decklid as desired.

2. Background Art

For an automobile with a rear compartment or trunk, a system that automates opening and closing the trunk cover, known as a decklid, is not readily available in the domestic market for coupe/sedan automobiles. Current standard trunk hinges and power sources do not easily allow a robust and affordable design of an automatic opening-closing device for decklids, since the energy required in conventional constructions is not compatible with the conventional power systems.

Similar devices used for minivan or sport utility vehicle liftgates, such as a 2005 Chrysler Pacifica liftgate, uses a linear actuator mounted inside the liftgate water seal. Another liftgate opening mechanism is shown in U.S. Pat. No. 6,719,356. This invention uses gas struts maneuvered at their body attachment joints to increase and decrease their lifting capacity by strut alignment, thus achieving an automatic opening and closing of the liftgate. However, the differences between liftgate and rear trunk weighting, and the different displacement paths, introduce new design constraints, different motions, different loadings and different mounting configurations of the hinges and actuators that are not readily adapted to decklid opening and closing.

Other attempts to motorize by simply installing an electric motor mounted to direct-drive, shelf-attached hinges have not succeeded because a motor in this arrangement would need to be large to achieve the proper speed/torque to open a typical trunk lid within a reasonable time and with reasonable force to overcome wind or snow loads, and available space for such apparatus at the opening is severely restricted.

SUMMARY OF THE INVENTION

The present invention overcomes the above mentioned disadvantages by a method and apparatus for displacing the trunk lid pivotally supported by a linkage mechanism, extending an expandable strut and motorizing a crank engageable to combine the force of the strut and the leverage of the linkage to control the opening and closing of the decklid.

Preferably, an embodiment of the design uses a four bar gutter-mounted hinge set, and an expandable strut, preferably powered by a nitrogen-charged gas chamber, and a motorized crank. Preferably, the hinge assembly comprises a pair of such hinge sets and a pair of struts. In addition, a crank coupled to the strut is moved by a motor so that the combination of leverage from the linkage, and the energy from the strut are combined to move the trunk lid to open and closed positions. The motor as referred to this description refers to any driver that positions the crank, for example, an electric motor combined with a transmission controlling the torque applied to the crank, so that the strut biasing and linkage configuration create a free-rise and free-fall condition for opening and closing, respectively. Moreover, although a single motor may be provided for each crank in the interest of distributed packaging to avoid obstruction of the opening, the number of motors need not correspond to the number of struts to be operated.

In the preferred embodiment, the initial position of the actuator lever or crank prevents initial free-rise of the decklid. In this configuration, the gas strut will not lift the trunk lid when the rear latch is released, for example, at the first press of the OPEN button. This feature is to prevent accidental opening due to wind, or to prevent rain from entering the trunk. When the OPEN button is pressed a second time, the motor rotates until the crank reaches a position at which the force of the strut is aligned in a direction such that the compression of the gas strut, preferably maximized at that position, and the leverage of the linkage urges the decklid open. As the crank arm is rotating, for example, from the position shown in FIG. 2 to the position shown in FIG. 3, the trunk lid rises, slowly initially and increasing in speed.

Preferably, the trunk lid at full open position, maintains a hold-open force at the trunk's rear handle of approximately 5 to 10 lbs. This configuration prevents a wind gust from closing the trunk because the resistance of the lift assist increases as the trunk closes, generally as shown on the graph of FIG. 6.

To close the trunk lid, the user may displace the decklid or, preferably, pushes a CLOSE button, preferably on a portable, remote console, and the motors move cranks back toward their original position and beyond. As the motor shaft rotates the crank, the force on the fully extended gas struts, and leveraged displacement of the four bar linkage, moves the decklid toward the closed position. As the trunk closes, the decklid reaches a position at which the gas strut resistance and the linkage leverage no longer support the trunk lid's weight, and the trunk begins to fall shut. When the motorized crank arms have rotated to the closed position, the decklid falls shut and a striker on the lid engages the latch.

A switch may be provided on the body-mounted latch to send a signal to the controller that actuates the motors to rotate back to the final, closed position. Then displacement to the initial opening position, loads the gas struts to a position that creates a condition for applying compression for application to the ends of the strut. Nevertheless, while the trunk lid may be disengaged from the trunk latch, preferably when the user first presses the OPEN button, no free-rise is immediately achieved by the linkage and geometry of the strut and crank. The gas struts may not be fully compressed, but become fully compressed when the OPEN button is pressed a second time, to rotate the crank coupled to the strut, so that this compression aids the linkage and the geometry in causing the decklid to free-rise.

BRIEF DESCRIPTION OF THE DRAWINGS

The present invention will be better understood by reference to the following detailed description of a preferred embodiment, when read in conjunction with the accompanying drawing, in which like reference characters refer to like parts throughout the views and in which.

DETAILED DESCRIPTION OF A PREFERRED EMBODIMENT

Figure 1:
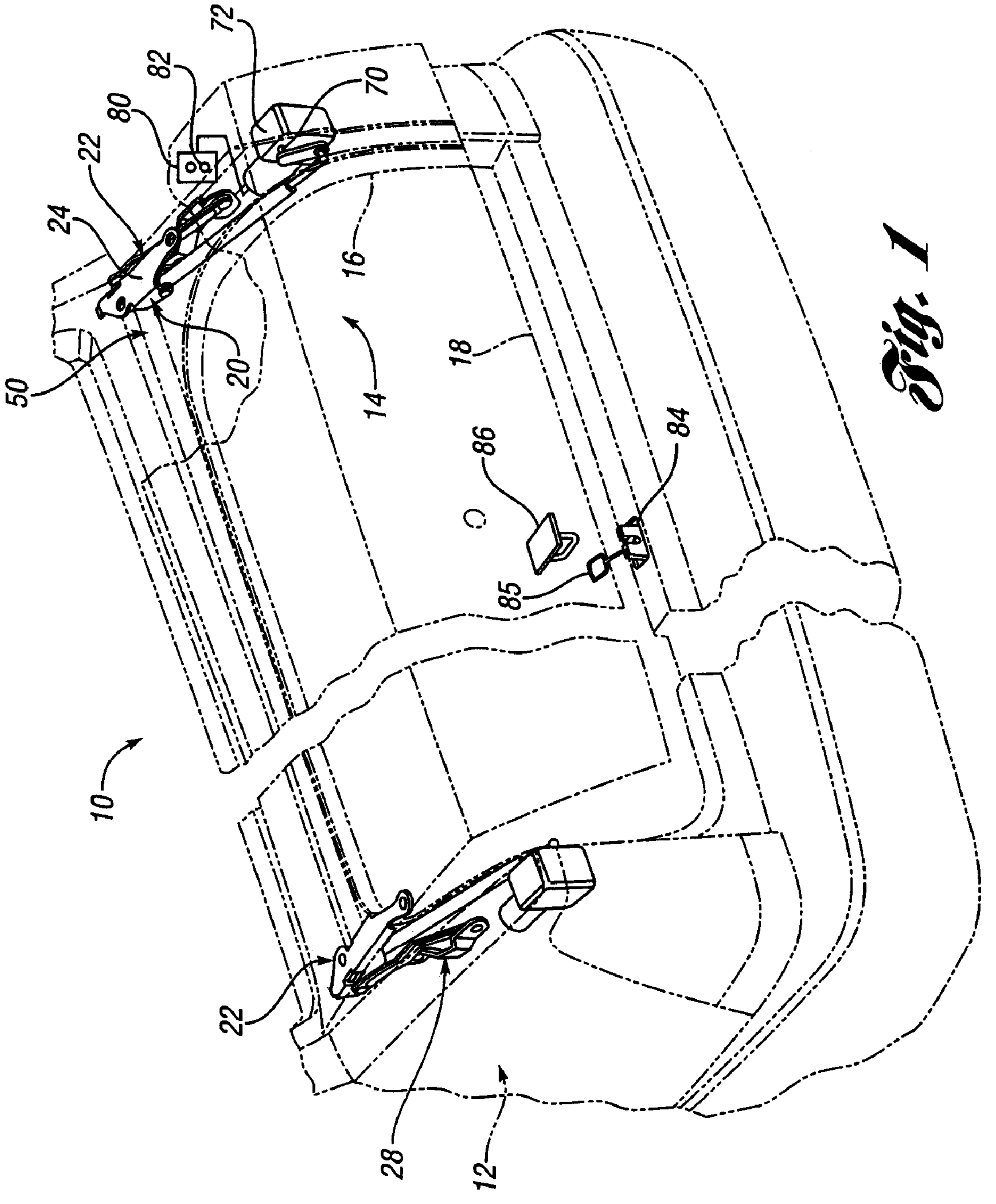
FIG. 1 is a fragmentary, perspective view of a vehicle body incorporating a decklid and support arrangement constructed according to a preferred embodiment of the present invention.

Referring first to FIG. 1, a vehicle 10 includes a vehicle body 12 defining a trunk 14 and an access opening 16. A decklid 18 matching the body style covers the opening 16 and is carried by a hinge mechanism 20. The hinge mechanism 20 comprises a linkage assembly 22 that carries a mount 24 secured to the decklid 18.

Figure 2:
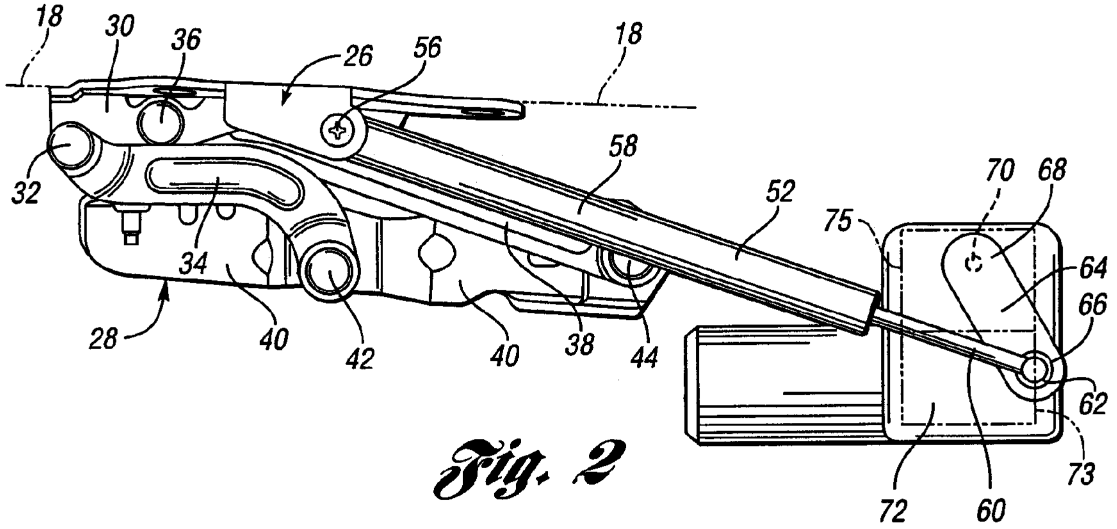
FIG. 2 is a sectional, elevational view of a portion of the apparatus shown in FIG. 1 demonstrating the decklid in a closed position before and after unlatching.

In the preferred embodiment, the mount 24 comprises a pair of brackets 26 secured on left and right sides of the vehicle body. Preferably, the bracket 26 is part of a four bar linkage 28 (FIG. 2) on each side of the body. A bracket 26 includes a leg 30 (FIG. 2) pivotally secured by a rivet 32 to a linkage arm 34 (FIG. 2). Another portion of the leg 30 is pivotally secured by a rivet 36 at a position spaced apart from the rivet 32 to a bar or linkage arm 38. Both the lever arm 34 and the lever arm 38 are pivotally secured at spaced apart positions to a support bar 40, for example, by pivot pins 42 and 44 respectively. The four bars 26, 34, 38 and 40 permit linkage 28 to offer leverage to the decklid 18 during displacement with respect to the support bar 40 that is mounted to a supporting structure of the vehicle body 12.

In the preferred embodiment, both linkages 28 are carried in a channel 50 (FIG. 1) formed at the peripheral edge of the access opening 16. In addition, automated opening and closing of the decklid also includes an elongated expandable strut 52 also pivotally secured to a portion of the bracket 26. For example, pivot pin 56 connects a cylinder housing 58 for each of a pair of struts 52, at both of the left and right brackets 26 forming the mount 24. The telescoping piston member 60 (FIG. 2) of the extendable strut 52 is also coupled, via a mechanism to be described in greater detail hereinafter, with respect to the vehicle body 12 so as to provide assistance to the lifting of the mount 24 carried by the linkage 28 upwardly from the opening 16 in vehicle body 12. Preferably, the extendable strut 52 is also carried within the channel 50.

The other end of the strut 52, an end of the extendable piston 60, is pivotally secured to a crank 64. The end 62 of the piston 60 is pivotally secured to an end 66 of the crank 64. The other end 68 is fixed for rotation with an output shaft 70 (FIG. 2) extending outwardly from a motor housing 72. The crank 64 and the shaft 70 in the preferred embodiment also extend into the channel at the periphery of the access opening 16 so that the linkage 28, the extendable strut 52 and the actuator crank 64 are retained within the peripheral channel 50 without obstructing access opening 16 or the trunk space 14.

Figure 6:
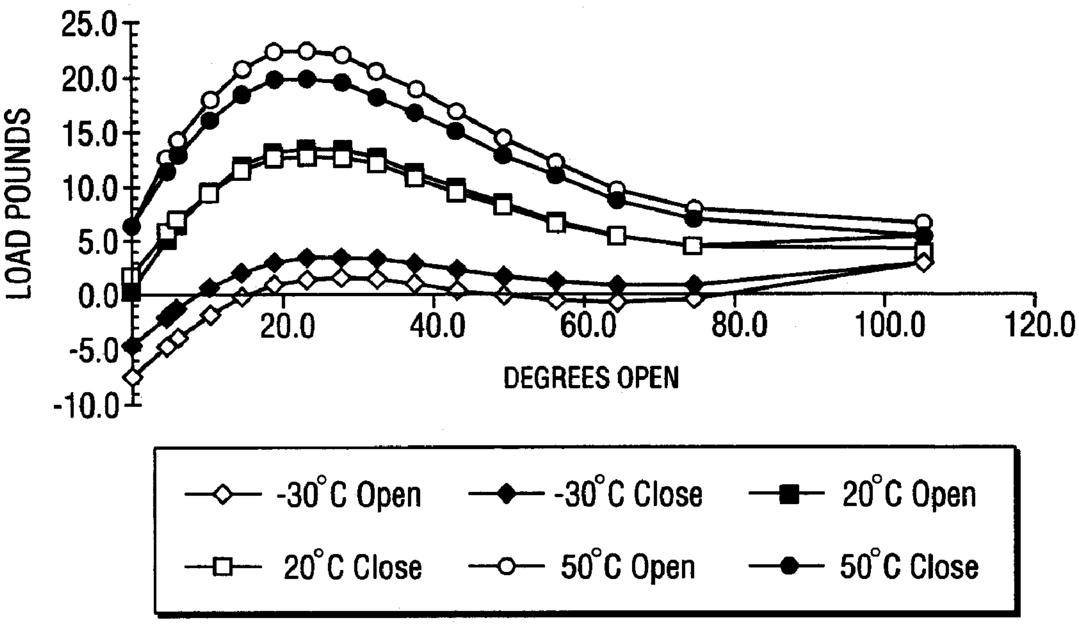
FIG. 6 is a graphic representation of the forces exerted at the decklid handle versus the degree to which the decklid is opened from the closed position during displacement with ascending movement of the decklid.
Figure 7:
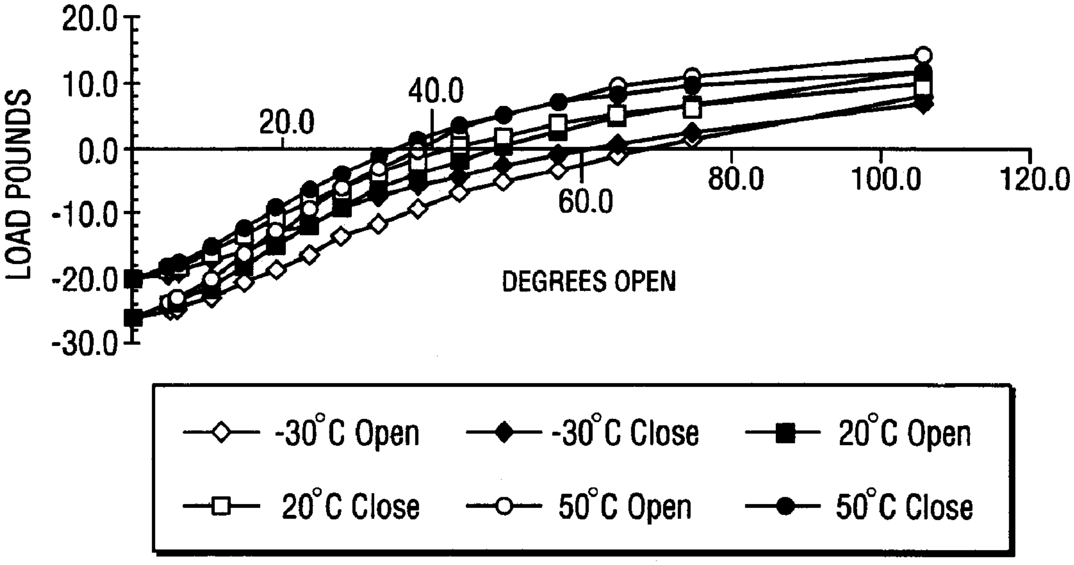
FIG. 7 is a graph demonstrating the pounds of load at the decklid handle according to the number of degrees open or closed of the decklid during displacement with descending movement of the decklid.

The housing 72 preferably houses an electric motor 73, including input controls and output controls for the motor. For example, the motor's output control, such as a transmission 75 for applying necessary torque to the crank 64 and displacing crank 64 through a range of movements as described in greater detail below. For example, an embodiment tested to operationally control the displacement mechanism on a decklid throughout the entire opening and closing path in temperatures down to approximately −30° C. is reflected in the graphs of FIGS. 6 and 7. Nevertheless, alternative motors, as well as various control systems or schemes, can expand the range of temperatures in which such a system will operate the trunk lid throughout its entire range of motion without departing from the present invention.

The initial closed position of the decklid with the hinge mechanism embodiment of the present invention is shown in FIG. 2. Actuation of the opening movement can be provided by a selector 80, for example the pushbutton 82 on a remote, portable console such as a key fob, transmits a signal to an actuator 85 (FIG. 1) that releases the latch 84 engaging the striker 86. The selector 80 may be part of the vehicle instrumentation within the passenger compartment of the vehicle, or it may be a remote control box communicating with a radio frequency receiver, or other communication systems used in motor vehicles for signaling switching of the motor in the housing 72.

Figure 3:
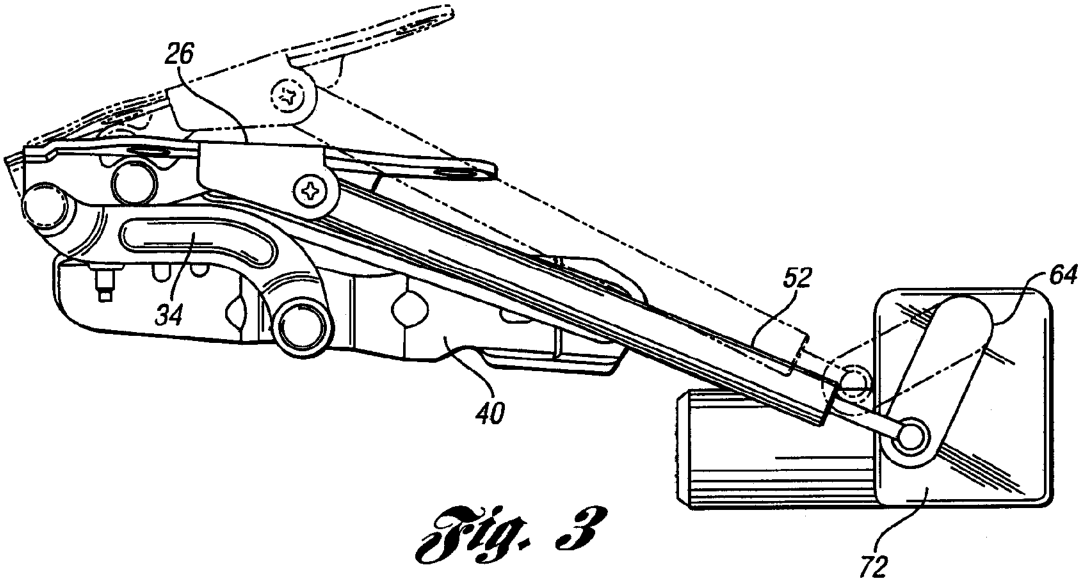
FIG. 3 is a sectional, elevational view similar to FIG. 2, but showing a different operative initial positions initiating and continuing opening by components shown in FIGS. 1 and 2.

In addition, a second actuator, for example, a second actuation of the button 82, actuates the motor 73 to rotate the drive shaft 70 to displace the crank 64 to the position shown in solid line in FIG. 3. In such a position, the decklid 18 retains its closed position against the vehicle body, but may be lifted against the resistance of the decklid weight, the linkage leverage and the inertia of the strut to manually raise the decklid toward the open position.

Subsequent movement of the crank 64 to the position shown in phantom line in FIG. 3 by rotation of the motor 73 initiates extension of the extendable strut 52 by the force of the expandable strut, for example, the force of compressed nitrogen in the strut, the leverage provided by linkages 28 with respect to the body 12, and the strut position forces the decklid 18 toward the open position as the mount 24 is moved by combination of the linkage mechanism 20 and the extendable strut 52 acting upon the decklid 18.

Figure 4:
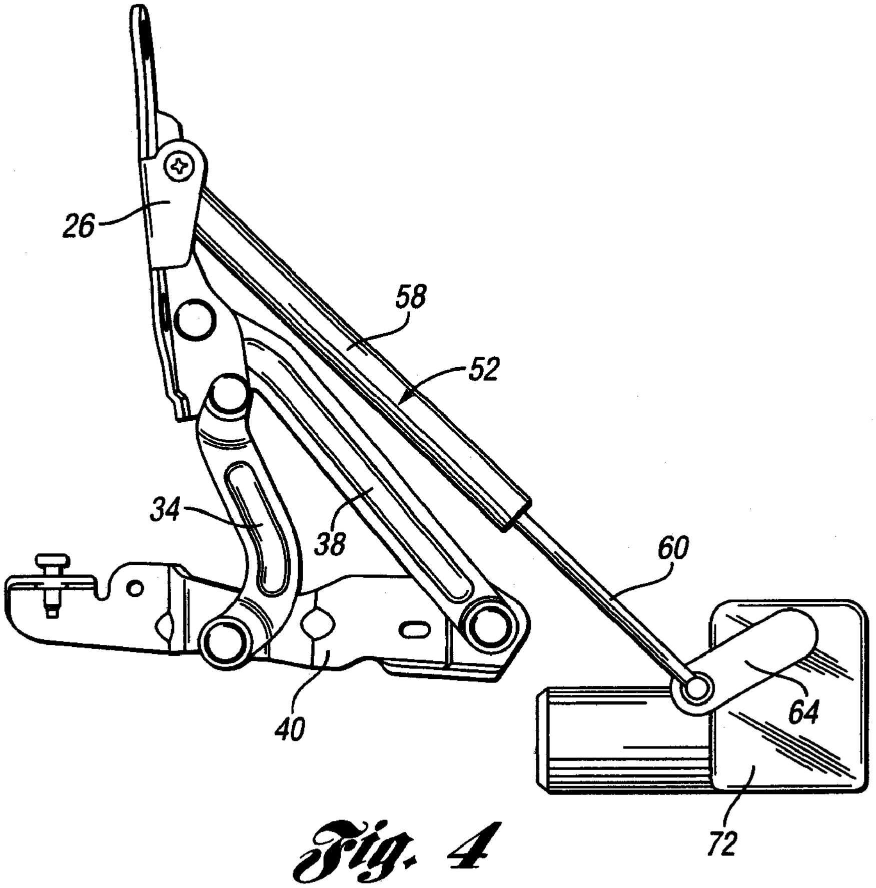
FIG. 4 is a sectional, elevational view similar to FIGS. 2-4, but showing the apparatus held in the fully open position.
Figure 5:
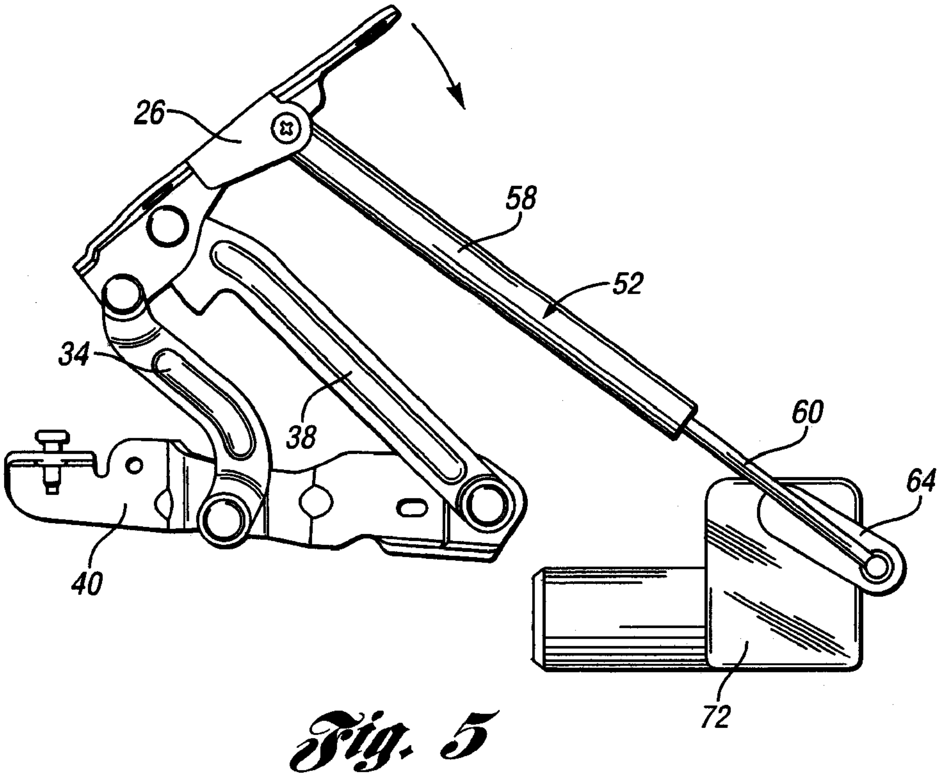
FIG. 5 is a sectional, elevational view similar to FIGS. 2-5 and showing the apparatus in descending position.

From the fully open position shown in FIG. 4, the crank 64 is rotated toward the position shown in FIG. 5. At this position, the decklid 18 reaches a position at which the gas strut resistance, and the linkage leverage, no longer support the decklid's weight. Accordingly, the decklid 18 is urged downwardly toward the closed position. The combined forces of the linkage leverage and the extendable strut 52 throughout the range of the opening movement and throughout the range of the closing movement are shown at various temperatures in graphs of FIGS. 6 and 7, respectively.

Having thus described a preferred embodiment of the present invention, many modifications will become apparent to those skilled in the art to which pertains without departing from the scope and spirit of the present invention as defined in the appended claims.

What is claimed is:

1. A vehicle decklid displacement mechanism for displacing a decklid pivotally secured to a vehicle body, comprising:

a linkage for displacing a lid with respect to vehicle body comprising at least one mounting carrying said decklid and a pivot mechanism for leveraging said mounting with respect to said vehicle body, wherein said pivot mechanism comprises at least one extension strut having ends and spring means biasing one said end away from a second said end, an actuator lever pivotally coupled to one of said first and second ends of said extension strut, a motor for driving said actuator lever to and between a first closing position and at least one extended opening position, whereby with said lever in said opening position, said linkage and said strut urge said mounting and said lid to an open position, and with said lever in said closed position, said linkage and said strut enable said lid to descend to said closed position, and wherein said pivot mechanism comprises a four bar linkage.

2. The invention as described in claim 1 wherein said at least one strut comprises spaced first and second struts.

3. The invention as described in claim 1 wherein said at least one mounting comprises spaced first and second mountings.

4. The invention as described in claim 1 wherein said mount comprises a link in said four bar linkage and wherein said link is pivotally secured to the other of said first and second ends.

5. The invention as described in claim 1 wherein at least one of said vehicle body and said lid comprises a latch for retaining said lid in said closed position.

6. The invention as described in claim 5 and further comprising a control having first actuator for releasing said latch, a second actuator for displacing said lever from said close to said open position.

7. The invention as described in claim 6 wherein said first actuator and said second actuator comprise sequential activations of a single selector.

8. A method for automating opening and closing of a decklid pivotally secured to a vehicle body, the method comprising:

positioning a linkage for displacing the decklid with respect to the vehicle body including a mounting carrying the decklid and a pivot mechanism for leveraging said mounting with respect to said body, providing said pivot mechanism with at least one extension strut having end and spring means biasing one said end away from a second said end, providing an actuator lever pivotally coupled to one of said first and second ends of said extension strut, actuating a motor to displace said actuator lever for displacement to and between a first closing position and at least one extended opening position, whereby with said lever in said opening position, said linkage and said strut combinationally urge said mounting and said lid to an open position, sand with said lever in said closed position, said linkage and said strut combinationally enable said lid to descend to said closed position, and wherein said vehicle body has a body opening defined by a peripheral channel, and said positioning and said providing steps occur within said channel.

9. The invention as described in claim 8 wherein said actuating comprises unlatching said decklid before displacing said actuator lever.

10. The invention as described in claim 9 wherein said actuating comprises first and second manipulations of a single selector.

11. A vehicle decklid displacement mechanism for displacing a decklid pivotally secured to a vehicle body, comprising:

a linkage for displacing a lid with respect to vehicle body comprising at least one mounting carrying said decklid and a pivot mechanism for leveraging said mounting with respect to said vehicle body, wherein said pivot mechanism comprises at least one extension strut having ends and spring means biasing one said end away from a second said end, an actuator lever pivotally coupled to one of said first and second ends of said extension strut, and a motor for driving said actuator lever to and between a first closing position and at least one extended opening position, whereby with said lever in said opening position, said linkage and said strut urge said mounting and said lid to an open position, and with said lever in said closed position, said linkage and said strut enable said lid to descend to said closed position, and wherein said vehicle body has a body opening peripherally defined by a channel, and wherein said linkage and said actuator lever are installed in said channel.

* * * * *

UNITED STATES PATENT AND TRADEMARK OFFICE

CERTIFICATE OF CORRECTION

PATENT NO. : 7,293,819 B2
APPLICATION NO. : 11/278485
DATED : November 13, 2007
INVENTOR(S) : Michael J. Duffy It is certified that error appears in the above-identified patent and that said Letters Patent is hereby corrected as shown below:

In claim 6, column 5, line 34, please delete “close” and insert --closed--.

In claim 8, column 6, line 8, please delete “sand” and insert --and--.

Signed and Sealed this

Sixth Day of May, 2008

JON W. DUDAS
*Director of the United States Patent and Trademark Office*